United States Patent [19]

Natsuume

[11] 3,936,310

[45] Feb. 3, 1976

[54] HYDRAULIC COMPOSITION

[75] Inventor: Tadao Natsuume, Kawasaki, Japan

[73] Assignee: Nippon Zeon Co., Ltd., Tokyo, Japan

[22] Filed: Apr. 1, 1974

[21] Appl. No.: 456,880

[30] Foreign Application Priority Data
Apr. 4, 1973 Japan.................................. 48-38440

[52] U.S. Cl. ..................... 106/90; 106/97; 106/111; 106/314
[51] Int. Cl.² ......................... C04B 7/02; C04B 7/35
[58] Field of Search .......... 106/88, 90, 97, 314, 111

[56] References Cited
UNITED STATES PATENTS

| | | | |
|---|---|---|---|
| 2,534,915 | 12/1950 | King...................................... | 106/90 |
| 2,790,724 | 4/1957 | Bergman.............................. | 106/90 |
| 3,202,521 | 8/1965 | Lorenzen.............................. | 106/90 |
| 3,817,767 | 6/1974 | Bozer et al........................... | 106/90 |

*Primary Examiner*—J. Poer
*Attorney, Agent, or Firm*—Sherman & Shalloway

[57] ABSTRACT

A hydraulic composition comprising 100 parts by weight of a hydraulic substance and 0.01 – 5 parts by weight of a sulfosuccinic acid derivative, which latter compound is obtained by the addition reaction of a compound selected from the group consisting of maleic acid, fumaric acid citraconic acid, mesaconic acid and the monoalkali metal salts, dialkali metal salts, alkaline earth metal salts, monoammonium salts and diammonium salts of these acids, with a compound selected from the group consisting of sulfurous acid, alkali metal sulphites, alkaline earth metal sulphites, ammonium sulphite, alkali metal hydrogen sulphites, alkaline earth metal hydrogen sulphites and ammonium hydrogen sulphite.

5 Claims, No Drawings

HYDRAULIC COMPOSITION

This invention relates to a hydraulic composition which not only can provide mortar or concrete of good workability by the addition of a relatively small amount of water but also makes possible the development of high strength after the cure of the mortar or concrete is completed.

As this type of hydraulic composition, that obtained by the admixture with the hydraulic substance of such additives as a polyalkylarylsulfonate or the lignosulfonate obtained from the sulfite pulp process, etc., has been known and is used with preference in many areas. However, these additives were not entirely satisfactory since the desired results were not developed by the use of these additives in small amounts and that, on the other hand, their use in excess results in the entrainment of an excessive amount of air in the mortar or concrete, retardation of the cure thereof, or an undesirable decline in the strength of the hardened product.

The object of the present invention is to provide an improved hydraulic composition by the discovery of a new additive not possessing the aforementioned shortcomings.

I found that a sulfosuccinic acid derivative obtained by the addition reaction of a compound selected from the group consisting of maleic acid

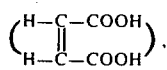

fumaric acid

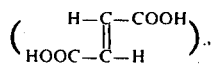

citraconic acid

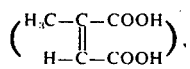

mesaconic acid

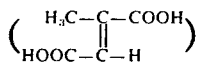

and the monoalkali metal salts, dialkali metal salts, alkaline earth metal salts, monoammonium salts and diammonium salts of these acids, with a compound selected from the group consisting of sulfurous acid, alkali metal sulphites, alkaline earth metal sulphites, ammonium sulphite, alkali metal hydrogen sulphites, alkaline earth metal hydrogen sulphites and ammonium hydrogen sulphite was an additive that could achieve the object of the present invention. Accordingly, there is provided in accordance with the present invention a novel hydraulic composition that consists of a hydraulic substance in which has been incorporated this additive.

Hydraulic substance, as used herein, denotes in accordance with the usual definition a substance which has the property of setting up a hydration reaction and hardening when mixed with water. As typical examples of hydraulic substances, included are portland cement, alumina cement, blast-furnace slag and mixtures of quicklime and siliceous sand.

On the other hand, as specific examples of the aforementioned sulfosuccinic acid derivatives, mention can be made of sulfosuccinic acid and sulfomethylsuccinic acid as well as the salts of the alkali metals, such as sodium and potassium, the salts of the alkaline earth metals, such as magnesium and calcium, and the ammonium salts, of these compounds.

These sulfosuccinic acid derivatives are effective even when used in smaller amounts than in the case of the conventional additives. Moreover, even when these sulfosuccinic acid derivatives are used in relatively large amounts, there is no manifestation of any objectionable side effects amount — such as a decline in strength but, instead, they possess the excellent property of enhancing the effects that are had by their addition. Hence, no particular restrictions are imposed as regards the proportion in which these sulfosuccinic acid derivatives are admixed with the hydraulic substance in this invention. However, for usual purposes, the sulfosuccinic acid derivatives are suitably used in an amount of 0.01 – 5 parts by weight, and especially 0.05 – 1.0 part by weight, per 100 parts by weight of the hydraulic substance.

The hydraulic composition of this invention consisting of the hydraulic substance incorporated with the aforesaid sulfosuccinic acid derivatives excels not only in its workability when it is to be mixed with water but also when the resulting mortar or concrete is to be used. In addition, it is possible to impart the hardened mortar or concrete with a high degree of strength at an early stage. It is not known by what mechanism these effects are brought about in the hydraulic composition of this invention. However, it is presumed, in all liklihood, that this is ascribable to the fact that since the aforesaid sulfosuccinic acid derivatives are highly soluble in water, the solubility of the hydrated alumina or siliceous substance present at the surface of the particles of the hydraulic substance is increased, with the consequence that the hydration reaction is enhanced.

Needless to say, the invention hydraulic composition can contain the other known additives such, for example, as curing accelerators, retarders, waterproofing agents, shrinkage reducing agents, etc., in conjunction with the foregoing sulfosuccinic acid derivatives.

The following examples will now be given for specifically illustrating the invention.

EXAMPLE 1

Eight parts by weight of sodium hydroxide and 9.8 parts by weight of maleic anhydride are added to 100 parts by weight of water to obtain a homogeneous solution of disodium maleate. On addition of 10.4 parts by weight of sodium bisulfite to the foregoing solution and stirring, the reaction proceeds exothermically. After the evolution of heat has settled down, the stirring is continued for a further 3 hours at 60°C. A rotary evaporator is then used and the water is removed from the reaction mixture to obtain 26.4 parts by weight of a white powder of trisodium sulfosuccinate.

A concrete test was conducted for determining the properties of the so obtained powder when used as a concrete additive. The results obtained are shown in Table 1.

The composition of the concrete used in the test was as follows: 300 parts by weight of portland cement, as coarse aggregate 1200 parts by weight of river gravel (heat loss = 0.1% by weight) of maximum particle diameter of 25 millimeters, and as fine aggregate either 760 parts by weight of river gravel (heat loss = 0.3% by weight) of maximum particle diameter of 2.5 millimeters (ratio of fine aggregate = 38.8%) when the additive was used or 800 parts by weight of the same river gravel (ratio of fine aggregate = 40%) when the additive was not used.

Table 1

| Experiment | Additive Class | Amount added based on cement (%) | Water-cement ratio | Slump (cm) | Amount of air (%) | Compressive strength (Kg/cm$^2$) 7 days | 28 days |
|---|---|---|---|---|---|---|---|
| Invention | trisodium sulfosuccinate | 0.125 | 0.45 | 6.5 | 1.6 | 256 | 359 |
| do. | do. | 0.25 | 0.45 | 7.8 | 1.8 | 262 | 369 |
| do. | do. | 0.5 | 0.45 | 7.5 | 1.7 | 274 | 374 |
| Control | commercial lignosulfonic type additive | 0.25 | 0.45 | 7.1 | 4.1 | 264 | 361 |
| do. | not added | — | 0.53 | 6.5 | 1.4 | 218 | 322 |

Note.
The slump, amount of air and compressive strength were measured in accordance with the JIS Methods A1101, A1116 and A1108, respectively.

It can be seen from the results presented in Table 1 that the results obtained when the trisodium sulfosuccinate of the invention was added were comparable, if not superior, to the instance where the commercial lignosulfonic acid type additive was added, not to mention the instance where no addition was made.

EXAMPLE 2

The reaction is operated exactly as in Example 1 but using 11.2 parts by weight of citraconic acid anhydride instead of maleic anhydride to synthesize 27.8 parts by weight of trisodium sulfomethhylsuccinate. A concrete test was conducted for ascertaining the properties of the so obtained sulfosuccinate when used as a concrete additive. The results obtained are shown in Table 2. The composition of the concrete was the same as that of Example 1.

strates exceedingly good performance when used as a water reducing agent.

I claim:

1. A hydraulic composition comprising 100 parts by weight of a hydraulic substance and 0.01 – 5 parts by weight of a sulfosuccinic acid derivative, which latter compound is obtained by the addition reaction of a compound selected from the group consisting of maleic acid, fumaric acid, citraconic acid, mesaconic acid and the monoalkali metal salts, dialkali metal salts, alkaline earth metal salts, monoammonium salts and diammonium salts of these acids, with the compound selected from the group consisting of sulfurous acid, alkali metal sulphites, alkaline earth metal sulphites, ammonium sulphite, alkali metal hydrogen sulphites, alkaline earth metal hydrogen sulphites and ammonium hydrogen sulphite.

2. The composition of claim 1 wherein said hydraulic substance is portland cement.

3. The composition of claim 1 wherein said sulfosuccinic acid derivative is trisodium sulfosuccinate or trisodium sulfomethylsuccinate.

4. The composition of claim 1 wherein said sulfosuccinic acid derivative is trisodium sulfosuccinate.

5. The composition of claim 1 wherein said sulfosuccinic acid derivative is trisodium sulfomethylsuccinate.

Table 2

| Experiment | Additive Class | Amount added based on cement (%) | Water-cement ratio | Slump (cm) | Amount of air (%) | Compressive strength (Kg/cm$^2$) 7 days | 28 days |
|---|---|---|---|---|---|---|---|
| Invention | trisodium sulfomethylsuccinate | 0.125 | 0.45 | 6.7 | 1.6 | 254 | 360 |
| do. | do. | 0.25 | 0.45 | 7.1 | 1.8 | 257 | 366 |
| do. | do. | 0.5 | 0.45 | 7.6 | 2.0 | 279 | 381 |
| Control | commercial lignosulfonic acid type additive | 0.25 | 0.45 | 6.7 | 4.2 | 257 | 350 |
| do. | not added | — | 0.53 | 6.5 | 1.6 | 208 | 305 |

It can be seen from Table 2 that the trisodium sulfomethylsuccinate of the present invention demon-

\* \* \* \* \*